(12) United States Patent
Lu et al.

(10) Patent No.: US 10,681,192 B2
(45) Date of Patent: Jun. 9, 2020

(54) ELECTRONIC DEVICE

(71) Applicant: Lenovo (Beijing) Co., Ltd., Beijing (CN)

(72) Inventors: Zhengliu Lu, Beijing (CN); Hailong Wu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/368,131

(22) Filed: Mar. 28, 2019

(65) Prior Publication Data
US 2019/0306291 A1 Oct. 3, 2019

(30) Foreign Application Priority Data
Mar. 30, 2018 (CN) .......................... 2018 1 0280377

(51) Int. Cl.
*H04M 1/02* (2006.01)
*H04W 88/02* (2009.01)

(52) U.S. Cl.
CPC ....... *H04M 1/0225* (2013.01); *H04M 1/0233* (2013.01); *H04M 1/0264* (2013.01); *H04M 1/0266* (2013.01); *H04W 88/02* (2013.01)

(58) Field of Classification Search
CPC .... H04M 1/02; H04M 1/0266; H04M 1/0264; H04M 1/0268; H04M 1/0233; H04M 1/0227; H04M 1/0225; H04M 2250/16; H04M 2250/52; H04M 2250/20; H04M 1/027; H04M 1/021; H04M 1/0243; H04M 1/0245; H04M 1/0247; H04M 1/0214; H04M 1/0235; H04M 1/0206; H04M 1/0249; H04M 1/0241; H04M 1/0216; H04M 1/0208; H04M 1/0212; H04M 1/0222; H04M 2201/38; H04M 2250/00; H04W 88/02; H04W 92/08; H04W 4/00; G06F 21/32; G06F 9/4418; G06F 3/14; G06F 1/1622; G06F 1/1692
See application file for complete search history.

(56) References Cited

U.S. PATENT DOCUMENTS

| | | | |
|---|---|---|---|
| 9,203,938 B2* | 12/2015 | Strawn | H04M 1/0235 |
| 9,983,637 B1* | 5/2018 | Morrison et al. | G06F 1/1681 |
| 2005/0101358 A1* | 5/2005 | Carpenter | 455/575.1 |
| 2005/0153668 A1* | 7/2005 | Lee | 455/90.3 |
| 2007/0009247 A1* | 1/2007 | Maeda et al. | 396/72 |
| 2007/0164924 A1* | 7/2007 | Anderson et al. | 345/1.1 |
| 2008/0026803 A1* | 1/2008 | Demuynck | 455/575.1 |
| 2009/0295976 A1* | 12/2009 | Choi | 348/333.11 |
| 2010/0277665 A1* | 11/2010 | Kuo et al. | 349/58 |

(Continued)

*Primary Examiner* — Meless N Zewdu
(74) *Attorney, Agent, or Firm* — Anova Law Group, PLLC

(57) ABSTRACT

An electronic device includes a first body and a second body movably connected to the first body via a connecting component. The first body includes at least a first display screen having a display area that is exposed from a first surface of the first body. The second body includes at least a second display screen that is exposed from a first surface of the second body and an acquisition apparatus that acquires images via at least a first window of the second body. The first window is arranged at a surface of the second body that is different from the first surface of the second body. The second body is movable from a first relative position with respect to the first body to a second relative position with respect to the first body.

18 Claims, 6 Drawing Sheets

(56) References Cited

U.S. PATENT DOCUMENTS

| | | | |
|---|---|---|---|
| 2013/0083467 A1* | 4/2013 | Becze | G06F 1/1601 |
| 2013/0135837 A1* | 5/2013 | Kimppinen | 361/807 |
| 2015/0378399 A1* | 12/2015 | Grinstead et al. | G06F 1/1681 |
| 2016/0116943 A1* | 4/2016 | Becze | G06F 1/1649 |
| 2017/0052566 A1* | 2/2017 | Ka et al. | G06F 1/1652 |
| 2018/0261661 A1* | 9/2018 | Jin | H04L 27/3267 |
| 2019/0138062 A1* | 5/2019 | Zeng | G06F 1/1686 |
| 2019/0258301 A1* | 8/2019 | Feliconio Pereira et al. | G06F 1/1681 |

* cited by examiner

ELECTRONIC DEVICE

CROSS-REFERENCE TO RELATED APPLICATION

This application claims priority to Chinese Application No. 201810280377.5, filed on Mar. 30, 2018, the entire contents of which are incorporated herein by reference.

FIELD OF THE PRESENT DISCLOSURE

The present disclosure relates to mobile device technology and, more particularly, to an electronic device.

BACKGROUND

With the development of display screen technologies for electronic devices, high screen-to-body ratio and even full screens are increasingly favored by users. For example, the screen-to-body ratio of the smartphone is becoming higher and higher, such that more display content is provided to the users within the same body size, and thus the smartphone having the high screen-to-body ratio is sought after by the users.

However, certain component, such as a camera, needs to be arranged at a front side of the electronic device, and is configured to perform, for example, face recognition when unlocking the electronic device, selfie, or the like. The component will occupy a certain amount of structural space, and hence the conventional electronic devices having the high screen-to-body ratio generally require a black notch on top of the front screen glass to arrange the component, i.e., a notch screen. Therefore, certain display space will be squeezed out, and the screen-to-body ratio has not yet reached the user's expectations.

The disclosed methods and systems are directed to solve one or more problems set forth above and other problems.

SUMMARY

In accordance with the present disclosure, there is provided an electronic device including a first body and a second body movably connected to the first body via a connecting component. The first body includes at least a first display screen having a display area that is exposed from a first surface of the first body. The second body includes at least a second display screen that is exposed from a first surface of the second body and an acquisition apparatus that acquires images via at least a first window of the second body. The first window is arranged at a surface of the second body that is different from the first surface of the second body. The second body is movable from a first relative position with respect to the first body to a second relative position with respect to the first body.

Also in accordance with the present disclosure, there is provided a method for controlling an electronic device having a first body and a second body movably connected to the first body. The first body includes at least a first display screen having a display area that is exposed from a first surface of the first body. The second body is movable from a first relative position with respect to the first body to a second relative position with respect to the first body. The method includes after the second body of the electronic device is in the first relative position with respect to the first body of the electronic device, controlling the first display screen arranged at the first body and the second display screen arranged at the second body to perform a splicing display, and after the second body of the electronic device is in the second relative position with respect to the first body of the electronic device, controlling the first display screen to perform the display and the second display screen to be closed.

Also in accordance with the present disclosure, there is provided an electronic device including a first body, a second body movably connected to the first body, an acquisition apparatus, and a processor. The first body includes at least a first display screen having a display area that is exposed from a first surface of the first body. The second body has a second display screen and is movable from a first relative position with respect to the first body to a second relative position with respect to the first body. The processor is configured to perform after the second body of the electronic device is in the first relative position with respect to the first body of the electronic device, controlling the first display screen arranged at the first body and the second display screen arranged at the second body to perform a splicing display, and after the second body of the electronic device is in the second relative position with respect to the first body of the electronic device, controlling the first display screen to perform the display and the second display screen to be closed.

BRIEF DESCRIPTION OF THE DRAWINGS

In order to provide clearer illustration of embodiments of the present disclosure, brief descriptions of the drawings of the present disclosure are provided.

DETAILED DESCRIPTION

Figure 1A:
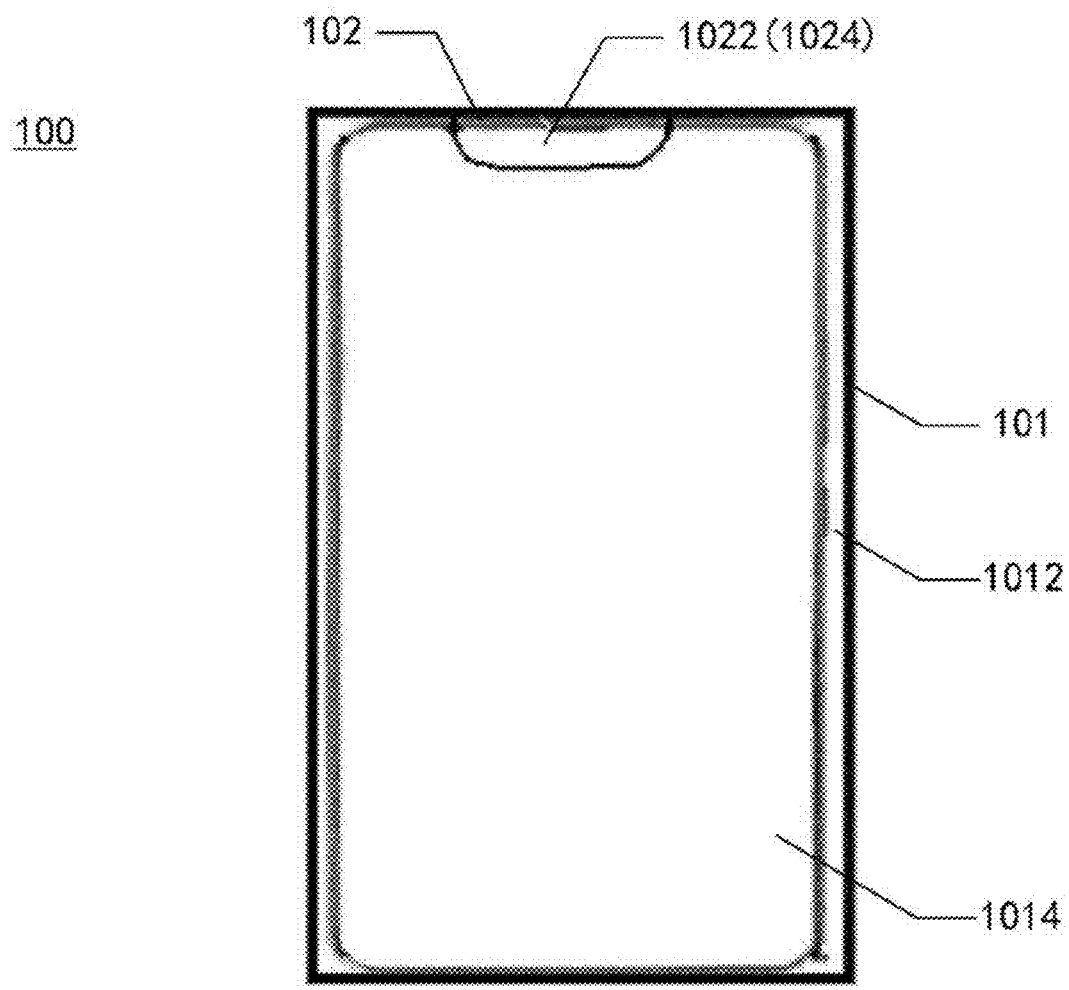
FIG. 1A shows an appearance of an electronic device, when a first body and a second body of the electronic device are in a first relative position according to the present disclosure.

Hereinafter, embodiments of the present disclosure are described with reference to the drawings. It is apparent that the disclosed embodiments are merely exemplary and not intended to limit the scope of the present disclosure. Details will be illustrated to provide understanding of the disclosed embodiments of the present disclosure. However, it will be appreciated that other embodiments may be derived from the disclosed embodiments without inventive efforts. In addition, descriptions of well-known structures and technologies may be omitted herein to avoid unnecessarily obscuring the concept of the present disclosure.

The terminologies used herein are merely for illustration, and are not intended to limit the present disclosure. The terms "including," "comprising," and variations thereof herein indicate the presence of the features, steps, processes, and/or components, but are not intended to exclude the presence of one or more other features, steps, processes, or components.

Unless otherwise defined, all the technical and scientific terms used herein have the same or similar meanings as generally understood by one of ordinary skill in the art. The terms used herein are to be interpreted as having a meaning consistent with the context of the specification and should not be interpreted in an ideal or too rigid way.

As described herein, an expression similar to "at least one of A, B, and C" should be generally interpreted in accordance with the meaning of the expression as generally understood by those skilled in the art. For example, "a system having at least one of A, B, and C" may include, but is not limited to, the system having A alone, B alone, C alone, both A and B, both A and C, both B and C, and/or all of A, B, and C. It will also be appreciated by those skilled in the art that any transitional conjunction and/or phrase representing two or more involved objects in the specification, claims, or drawings, may include anyone of the possibilities, e.g., any one or two of the involved objects. For example, A or B may represent including one of three possibilities, i.e., A alone, B alone, and both A and B.

Some block diagrams and/or flowcharts are shown in the drawings. It can be appreciated that some blocks of the block diagrams and/or flowcharts, or a combination thereof, can be implemented by computer program instructions. The computer program instructions can be provided to a general-purpose computer, a special purpose computer, or a processor of another programmable data processing apparatus, such that when the instructions executed by the processor, the apparatus implementing the functions/processes described in the block diagrams and/or flowcharts can be generated.

The technologies consistent with the present disclosure can be realized in the form of a hardware and/or software (including the firmware, microcode, or the like). The technologies consistent with the present disclosure can be also implemented in the form of a computer program product stored in a computer-readable medium including a number of instructions. In the context of the present disclosure, the computer-readable medium can be any medium that can include, store, communicate, propagate, or transmit the instructions. For example, the computer-readable medium can include, but is not limited to, an electronic, magnetic, optical, electromagnetic, infrared, or semiconductor system, apparatus, device, or transmission medium. For example, the computer-readable medium may include a magnetic storage device, such as a magnetic tape or a hard disk (HDD), an optical storage device, such as a compact disk (CD-ROM), a memory, such as a random access memory (RAM) or a flash memory, and/or a wired/wireless communication link.

An electronic device consistent with the present disclosure can include a first body and a second body. The first body can include at least a first display screen exposed from a first surface of the first body. The second body can be movably connected to the first body. The second body can include at least a second display screen and an acquisition apparatus. The second display screen can be exposed from a first surface of the second body. The acquisition apparatus can capture images through at least a first window of the second body arranged at a surface of the second body that is different from the first surface of the second body. If the second body is in a first relative position with respect to the first body, the first surface of the second body and the first surface of the first body can be in a same plane. If the second body is in a second relative position with respect to the first body, a plane at which the first window of the second body is arranged can be parallel to the first surface of the first body.

Consistent with the present disclosure, the second display screen and the acquisition apparatus of the electronic device can be arranged at the second body, and the positions of the second display screen and the acquisition apparatus in the electronic device can be changed as the relative position of the second body and the first body changes. As such, the electronic device can have various forms, and hence the use of the electronic device can be more flexible and the requirement of multiple functions of the electronic device can be satisfied.

Figure 1B:
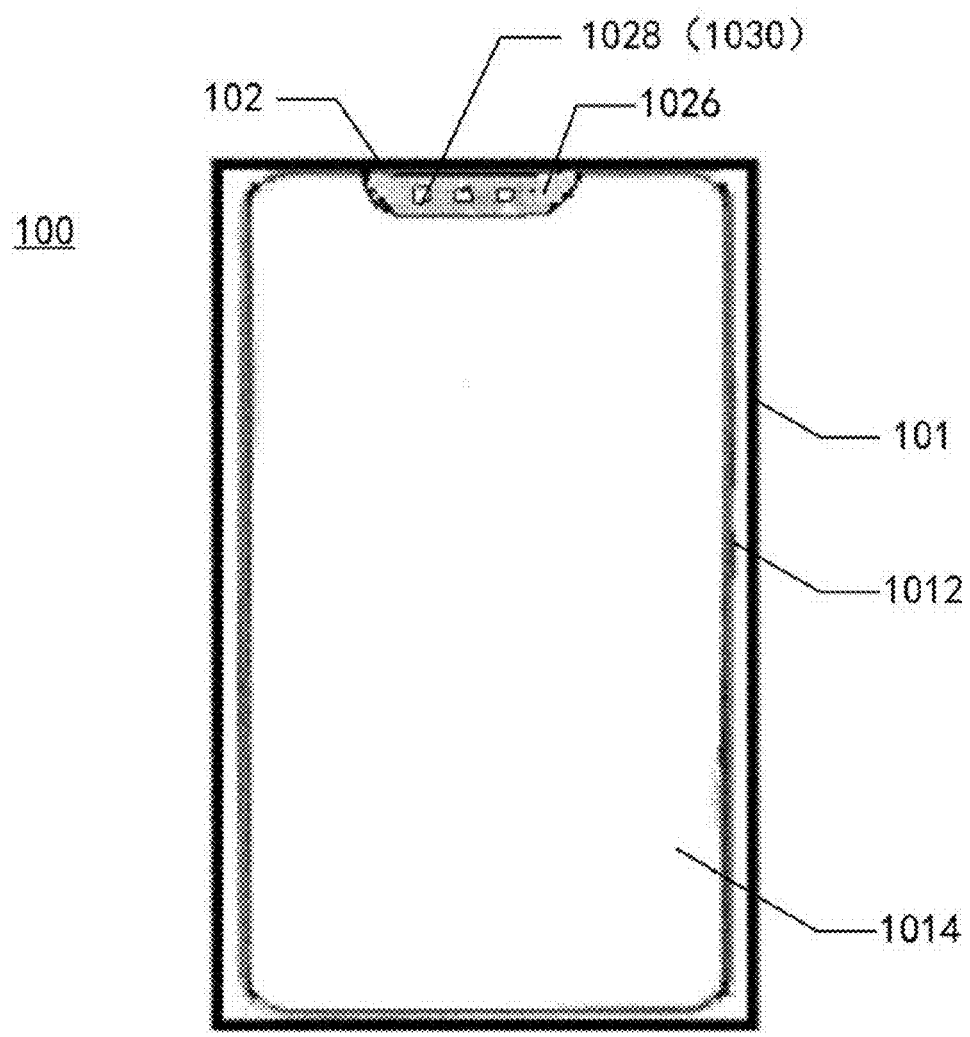
FIG. 1B shows another appearance of an electronic device, when a first body and a second body of the electronic device are in a second relative position according to the present disclosure.

FIGS. 1A and 1B schematically show appearances of an electronic device 100 consistent with the present disclosure, when a first body 101 and a second body 102 of the electronic device 100 are in different relative positions.

FIG. 1A schematically shows the appearance of the electronic device 100, when the first body 101 and the second body 102 of the electronic device 100 are in the first relative position. FIG. 1B schematically shows the appearance of the electronic device 100, when the first body 101 and the second body 102 of the electronic device 100 are in the second relative position.

As shown in FIGS. 1A and 1B, the electronic device 100 includes the first body 101 and the second body 102. The second body 102 is connected to the first body 101 via a movable connecting component, such as a rotating shaft or the like.

The first body 101 includes at least a first display screen 1014 exposed from a first surface 1012 of the first body 101.

The second body 102 includes at least a second display screen 1024 as shown in FIG. 1A and an acquisition apparatus 1028 as shown in FIG. 1B. The second display screen 1024 is exposed from a first surface 1022 of the second body 102. The acquisition apparatus 1028 captures images through at least a first window 1030 of the second body 102 arranged at a surface of the second body 102 that is different from the first surface 1022 of the second body 102 (e.g., a surface 1026 opposite to the first surface 1022 of the second body 102). It will be appreciated that in the examples of FIGS. 1A and 1B, the first window 1030 arranged at the surface 1026 opposite to the first surface 1022 of the second body 102 is merely exemplary. In some embodiments, the first window 1030 can be arranged at any surface of the second body 102 other than the first surface 1022 of the second body 102 (e.g., a surface perpendicular to the first surface 1022 of the second body 102, i.e., a top surface of the second body 102 shown in FIG. 1A).

If the second body 102 is in the first relative position with respect to the first body 101, the first surface 1022 of the second body 102 and the first surface 1012 of the first body 101 can be in the same plane. If the second body 102 is in the second relative position with respect to the first body 101, the plane at which the first window 1030 of the second body 102 is arranged can be parallel to the first surface 1012 of the first body 101.

In some embodiments, the plane at which the first window 1030 of the second body 102 is arranged can be parallel to the first surface 1012 of the first body 101. For example, the first window 1030 of the second body 102 and the first surface 1012 of the first body 101 can be in the same plane (as shown in FIG. 1B), or the first window 1030 of the second body 102 and the first surface 1012 of the first body 101 can be in different planes that are mutually parallel to each other. Whether the first window 1030 of the second body 102 and the first surface 1012 of the first body 101 are in the same plane or different plans can be determined, according to the relative position of the first window 1030 of the second body 102 and the first surface 1022 of the second body 102.

It can be appreciated that the appearances of the first body 101 and the second body 102 shown in FIGS. 1A and 1B are merely for illustration and are not intended to limit the technical solutions of the present disclosure. In some embodiments, from the view point of FIG. 1A, the second body 102, the first surface 1022 of the second body 102, and the second display screen 1024 have a notch shape, which is merely an example. In some embodiments, the second body 102, the first surface 1022 of the second body 102, and the second display screen 1024 can have other shapes, and/or the layout of the second body 102, the first surface 1022 of the second body 102, and the second display screen 1024 can be different (e.g., the layout shown in FIG. 2B). In some embodiments, the shapes and layout of the first body 101, the first surface 1012 of the first body 101, and the first display screen 1014 can also be different from the shapes and layout shown in FIGS. 1A and 1B.

Figure 2A:
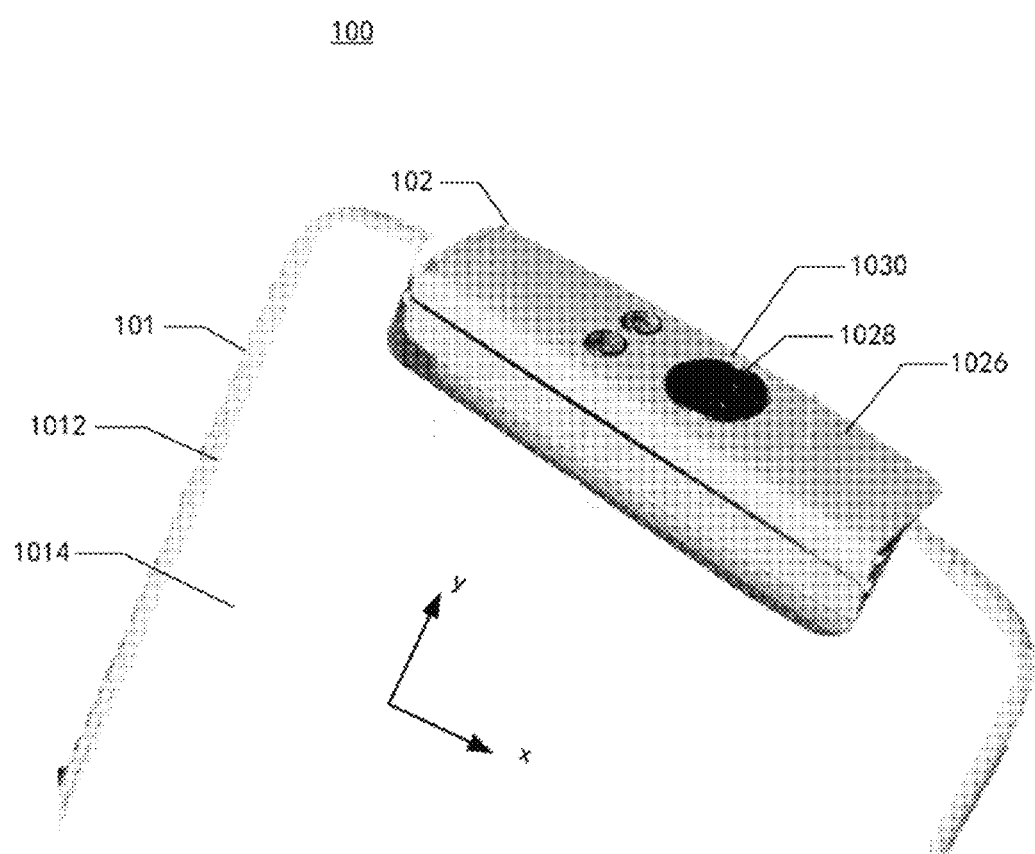
FIG. 2A shows a process of changing a relative position of a first body and a second body of an electronic device according to the present disclosure.

In some embodiments, the relative position of the second body 102 and the first body 101 can be changed from the first relative position to the second relative position through any suitable manner, such as rotation, flip, or the like. FIG. 2A shows an example of the second body 102 being flipped relative to the first body 101.

FIG. 2A schematically shows a process of changing the relative position of the first body 101 and the second body 102 of the electronic device 100 consistent with the present disclosure.

As shown in FIG. 2A, the second body 102 is movably connected to the first body 101 via a rotating shaft that is parallel to an X direction (not shown in the FIG. 2A due to occlusion). As the second body 102 rotates along the rotating shaft that is parallel to the X direction, the second body 102 can be flipped from the first relative position to the second relative position with respect to the first body 101.

The relative position of the second body 102 and the first body 101 shown in FIG. 2A is a transitional position between the first relative position and the second relative position. As shown in the FIG. 2A, two surfaces of the second body 102, i.e., the surface 1026 and a surface perpendicular to the surface 1026, can be seen. The acquisition apparatus 1028 can perform image acquisition through the first window 1030 at the surface 1026. The first surface 1022 of the second body 102 is obscured in the view angle of FIG. 2A. For example, the first surface 1022 of the second body 102 can be an obscured surface that is perpendicular to a Y-direction shown in FIG. 2A.

In some embodiments, when the rotating shaft that is parallel to the X direction is located at a lower portion of the second body 102 in FIG. 2A and the second body 102 is rotated along the rotating shaft to reach the second relative position with respect to the first body 101, the surface 1026 of the second body 102 can protrude from the first surface 1012 of the first body 101. A plane that the first window 1030 of the second body 102 is located can be parallel to, but not coplanar with, the first surface 1012 of the first body 101.

In some embodiments, as shown in FIG. 2A, the second body 102 of the electronic device 100 is movably connected to the first body 101 through the rotating shaft that is parallel to the X direction. In some other embodiments, the second body 102 of the electronic device 100 can also be movably connected to the first body 101 through a rotating shaft that is parallel to the Y direction. For example, a bottom surface of the second body 102 can be connected to a top surface of the first body 101 through the rotating shaft that is parallel to the Y direction. The second body 102 can be rotated clockwise or counterclockwise with respect to the first body 101 about the rotating shaft that is parallel to the Y direction, thereby changing the relative position of the second body 102 with respect to the first body 101.

Figure 2B:
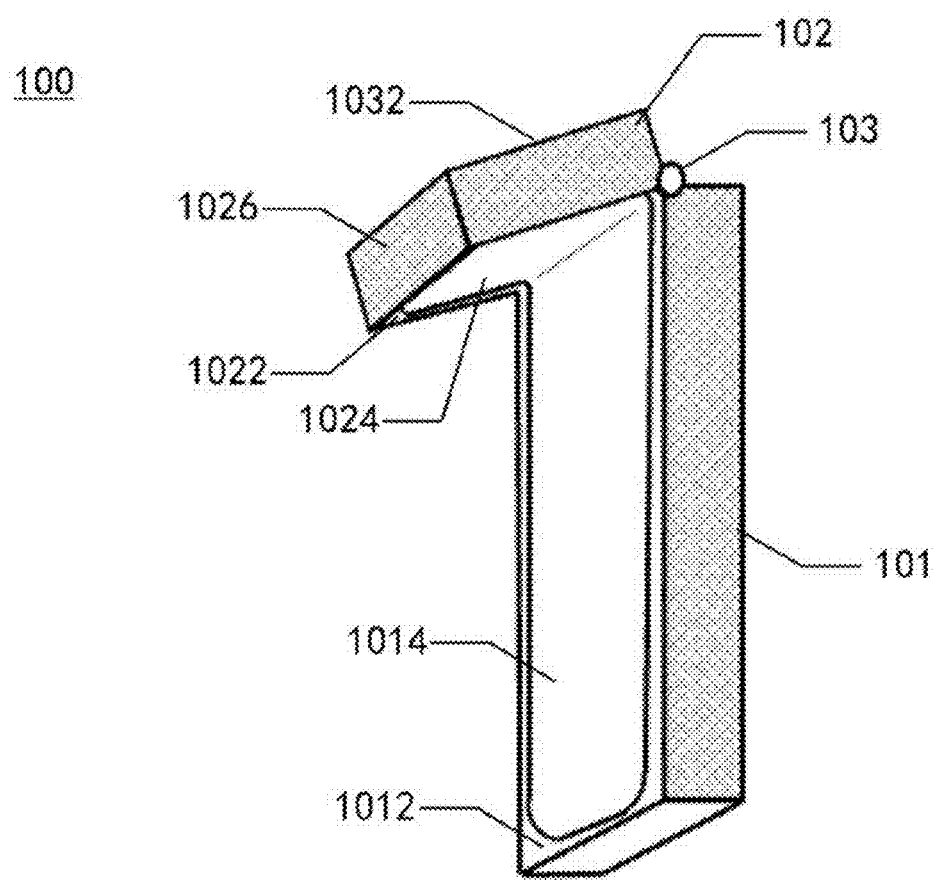
FIG. 2B shows another process of changing a relative position of a first body and a second body of an electronic device according to the present disclosure.

FIG. 2B schematically shows another process of changing the relative position of the first body 101 and the second body 102 of the electronic device 100 consistent with the present disclosure.

As shown in FIG. 2B, the second body 102 is connected to the first body 101 via a rotating shaft 103, and the rotating shaft 103 is arranged at an edge of the second body 102. The second body 102 can be changed from the first relative position to the second relative position with respect to the first body 101 by folding the second body 102 around the rotating shaft 103. In some embodiments, the first window 1030 of the second body 102 can be arranged at the surface 1026 shown in FIG. 2B, such that the second body 102 can be in the second relative position with respect to the first body 101 as shown in FIG. 2B, and the acquisition apparatus 1028 can capture the image through the first window 1030 at the surface 1026. In some other embodiments, the first window 1030 of the second body 102 can be arranged at the surface 1032 as shown in FIG. 2B, such that the second body 102 can be at a position relative to the first body 101 between the first relative position and the second relative position as shown in FIG. 2B. In this scenario, when the second body 102 reaches the second relative position with respect to the first body 101, the second body 102 can obscure a portion of the first surface 1012 of the first body 101.

In some embodiments, the first display screen 1014 and the second display screen 1024 of the electronic device 100 shown in FIG. 2B can form a complete and flexible display screen. As such, when the first body 101 and the second body 102 are in the first relative position, the first display screen 1014 and the second display screen 1024 can display the image as a complete display screen, and how to splice a seam between the first display screen 1014 and the second display screen 1024 does not need to be considered.

In some embodiments, if the second body 102 is in the first relative position with respect to the first body 101, the second body 102 does not obscure the display area of the first display screen 1014, as shown in FIG. 1A.

In some embodiments, if the second body 102 is in the first relative position with respect to the first body 101, the first display screen 1014 and the second display screen 1024 can be controlled to perform a splicing display. For example, the splicing display of the first display screen 1014 and the second display screen 1024 can be implemented by a projector using a seamless splicing technology, e.g., an edge blending technology.

In some embodiments, if the first display screen 1014 and the second display screen 1024 are displaying an image using the splicing display, the first display screen 1014 can be controlled to display a first portion of the image and the second display screen 1024 can be controlled to display a second portion of the image, such that the image can be completely outputted and a seamless display can be achieved.

In some embodiments, if the second body 102 is in the first relative position with respect to the first body 101, a first edge at the first surface 1022 of the second body 102 can completely match a first edge at the first surface 1012 of the first body 101. The edge may be a frame or bezel or any border of the body surrounding the display. The first edge at the first surface 1022 of the second body 102 refers to an edge at the first surface 1022 that is close to the first surface 1012 of the first body 101 and the first edge at the first surface 1012 of the first body 101 refers to an edge at the first surface 1012 of the first body 101 that is close to the first surface 1022 of the second body 102.

In some embodiments, the first edge at the first surface 1022 of the second body 102 and the first edge at the first surface 1012 of the first body 101 can be made of a first material. The first material can be, for example, OLED (organic light emitting diode), glass, or the like.

In some embodiments, light of the display area that is close to the first edge at the first surface 1012 of the first body 101 can extend toward the first edge at the first surface 1022 of the second body 102, and the light of the display area that is close to the first edge at the first surface 1022 of the second body 102 can extend toward the first edge at the first surface 1012 of the first body 101. As such, a visual sensation of the seam between the first display screen 1014 and the second display screen 1024 can be significantly weakened, and even a completely seamless display effect can be achieved.

In some embodiments, the edge of the second display screen 1024 can partially protrude from the edge at the first surface 1022 of the second body 102. When the second body 102 is in the first relative position with respect to the first body 101, the edge of the second display screen 1024 can be partially in contact with the edge of the first display screen 1014, and the seam between the second body 102 and the first body 101 can be partially covered. In some other embodiments, the edge of the second display screen 1024 can be a prism. When the second body 102 is in the first relative position with respect to the first body 101, a covering effect at the seam between the second body 102 and the first body 101 can be formed using the refraction of the prism. Thus, the user can be visually perceived that there is no seam in the splicing of the first display screen 1014 and the second display screen 1024.

In some embodiments, the position of the second display screen 1024 at the first surface 1022 of the second body can be moved. For example, when the second body 102 is in the first relative position with respect to the first body 101, the second display screen 1024 can be moved downwardly closer to, and even in contact with, the first display screen 1014 as shown in FIG. 1A. As such, when the second display screen 1024 and the first display screen 1014 are performing the splicing display, the seam between the second display screen 1024 and the first display screen 1014 can be effectively reduced. When the relative position of the second body 102 with respect to the first body 101 is changed to the second relative position, the second display screen 1024 can be moved away from the first display screen 1014, and thus the second display screen 1024 can be rotated relative to the first body 101.

In some embodiments, if the second body 102 is in the second relative position with respect to the first body 101, the first display screen 1014 can be controlled to perform the display and the second display screen 1024 can be controlled to be closed. In such case, the second relative position may be considered as a closed position and the first relative position may be considered as an open position.

In some embodiments, if the second body 102 is in the second relative position with respect to the first body 101, the acquisition apparatus 1028 can be awakened as a face recognition apparatus. In some embodiments, if the recognition of the captured face is successful by using the face recognition apparatus, the first display screen 1014 can be controlled to be lighted up.

In some embodiments, the acquisition apparatus 1028 can also be used as a front-facing camera for application scenarios, such as selfie or the like. In some embodiments, if the second body 102 is in the second relative position with respect to the first body 101, the acquisition apparatus 1028 can be awakened to perform front-facing shooting, which satisfies the image acquisition requirements of the application scenarios, such as user's selfie or the like.

Consistent with the present disclosure, as the relative position of the first body 101 and the second body 102 changes, the size of the display area for displaying the image on the electronic device 100 can be flexibly changed. When the user needs the acquisition apparatus 1028 to perform the front-facing shooting (e.g., face recognition, selfie, or the like), the corresponding front-facing shooting function can be realized, and various flexible functions can be achieved.

Consistent with the present disclosure, the electronic device 100 can effectively solve the contradiction between the high screen-to-body ratio and the front-facing acquisition apparatus (e.g., the front-facing camera, the front-facing recognition apparatus, or the like) occupying the front space of the electronic device 100 to some extent. For example, when the second body 102 is in the first relative position with respect to the first body 101, the first display screen 1014 and the second display screen 1024 of the electronic device 100 can perform the splicing display, such that the electronic device 100 can have the high screen-to-body ratio display effect. When the user needs to use the front-facing image acquisition, the second body 102 can be changed to be in the second relative position with respect to the first body 101, and the acquisition apparatus 1028 at the second body 102 can be used as the front-facing acquisition apparatus.

Figure 3:
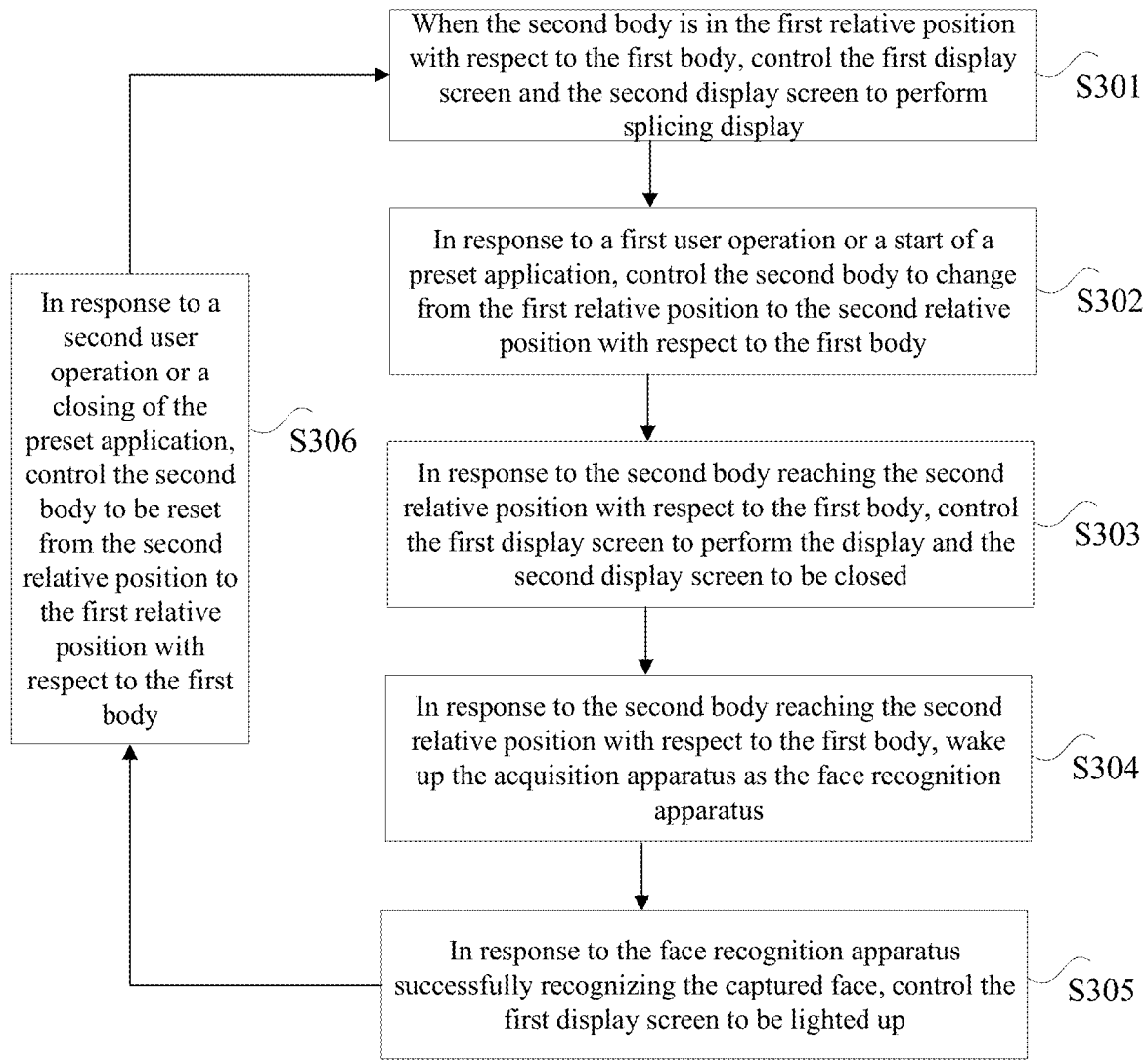
FIG. 3 is a schematic flowchart of a method for controlling an electronic device according to the present disclosure.

FIG. 3 is a schematic flowchart of a method for controlling the electronic device 100 consistent with the present disclosure. As shown in FIG. 3, the method for controlling the electronic device 100 includes processes S301 to S306. In some embodiments, the method for controlling the electronic device 100 may include some of the processes S301 to S306, or the method of controlling the electronic device 100 may include any combination of any of the processes S301 to S306 while there is no conflict.

At S301, when the second body 102 is in the first relative position with respect to the first body 101, the first display screen 1014 and the second display screen 1024 are controlled to perform the splicing display.

At S302, in response to a first user operation or a start of a preset application, the second body 102 is controlled to change from the first relative position to the second relative position with respect to the first body 101. The first user operation can be, for example, the user manually rotating the first body 101 or the second body 102, or the user operating, e.g., an operation icon or the like, on the electronic device 100. The preset application can be, for example, a face recognition unlocking application, a front-shooting application, or the like.

At S303, in response to the second body 102 reaching the second relative position with respect to the first body 101, the first display screen 1014 is controlled to perform the display and the second display screen 1024 is controlled to be closed.

At S304, in response to the second body 102 reaching the second relative position with respect to the first body 101, the acquisition apparatus is woken up as the face recognition apparatus 1028.

At S305, in response to the face recognition apparatus 1028 successfully recognizing the captured face, the first display screen 1014 is controlled to be lighted up.

At S306, in response to a second user operation or a closing of the preset application, the second body 102 is controlled to be reset from the second relative position to the first relative position with respect to the first body 101. The second user operation can be, for example, the user manually rotating the first body 101 or the second body 102 to change the second body 102 relative to the first body 101 from the second relative position to the first relative position, or the user operating an operation icon having a reset function or the like.

Figure 4:
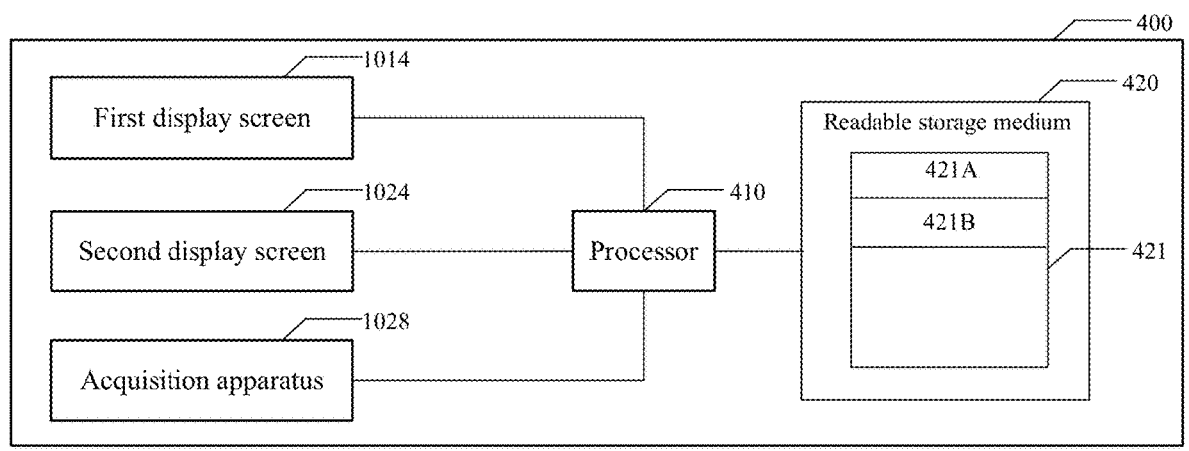
FIG. 4 is a schematic block diagram of a computer system according to the present disclosure.

FIG. 4 is a schematic block diagram of an electronic device 100 consistent with the present disclosure, and schematically shows a computer system 400 implementing the electronic device 100 for performing the above disclosed methods. The computer system shown in FIG. 4 is merely an example and is not intended to limit the function and scope of the present disclosure.

As shown in FIG. 4, the computer system 400 includes a processor 410, a computer readable storage medium 420, the first display screen 1014, the second display screen 1024, and the acquisition apparatus 1028. The computer system 400 can implement the method for controlling the electronic device 100 consistent with the present disclosure.

The processor 410 can include, for example, a general purpose microprocessor, an instruction set processor, a chipset, and/or a special purpose microprocessor (e.g., an application specific integrated circuit (ASIC)), or the like. The processor 410 can also include an onboard memory for caching. The processor 410 can be a single processing unit or a plurality of processing units for implementing different processes of the method for controlling the electronic device 100 consistent with the present disclosure.

Computer readable storage medium 420 can include, for example, any medium that can contain, store, communicate, propagate, or transmit the instructions. For example, the readable storage medium can include, but is not limited to, an electronic, magnetic, optical, electromagnetic, infrared, or semiconductor system, apparatus, device, or propagation medium. The readable storage medium can include, for example, a magnetic storage apparatus, e.g., a magnetic tape or a hard disk (HDD), an optical storage apparatus, e.g., a compact disk (CD-ROM), a memory, e.g., a random access memory (RAM) or a flash memory, and/or a wired/wireless communication link.

The computer readable storage medium 420 can include a computer program 421. The computer program 421 can include code/computer executable instructions that, when executed by the processor 410, cause the processor 410 to implement the method for controlling the electronic device 100 consistent with the present disclosure, or any variation thereof.

The computer program 421 can be configured to have, for example, computer program codes including computer program modules. In some embodiments, the codes in computer program 421 can include one or more program modules including, for example, module 421A, module 421B, and/or the like. It can be appreciated that the division manner and number of modules are not fixed, and those skilled in the art can use any suitable number of program modules or combination of the program modules according to actual situations. When the combination of the program modules is executed by the processor 410, the processor 410 can implement the method for controlling electronic device 100 consistent with the present disclosure, or any variation thereof.

In some embodiments, the processor 410 can interact with the first display screen 1014, the second display screen 1024, and the acquisition apparatus 1028 to implement method for controlling the electronic device 100, or any variation thereof.

A computer readable medium consistent with the present disclosure may be included in the device/apparatus/system in the embodiments described above or may be a separate component without being incorporated into the device/apparatus/system. The computer readable medium described above can store one or more programs that, when being executed, implement the method for controlling the electronic device 100 consistent with the present disclosure.

The computer readable medium can be a computer readable signal medium, a computer readable storage medium, or any combination of the two. The computer readable storage medium can include, for example, but not limited to, an electronic, magnetic, optical, electromagnetic, infrared, or semiconductor system, apparatus, or device, or any combination thereof. The computer readable storage medium may include, but are not limited to, an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

Consistent with the present disclosure, the computer readable storage medium can include any tangible medium that contains or stores a program. The program can be used by or in connection with an instruction execution system, apparatus, or component. The computer readable signal medium can include a data signal that is propagated in the baseband or as part of a carrier. The data signal can carry the computer readable program code. The propagated data signal can have a variety of forms including, but not limited to, the electromagnetic signal, optical signal, or any suitable combination thereof. The computer readable signal medium can also be any computer readable medium other than the computer readable storage medium, which can transmit, propagate, or transport a program for use by or in connection with an instruction execution system, apparatus, or device. The program code stored in the computer readable medium can be transmitted by any suitable medium, including, but not limited to, wireless cable, wire cable, optical cable, radio frequency, or the like, or any suitable combination thereof.

The flowcharts and block diagrams in the drawings illustrate the possible architecture, function, and operation that can be achieved by the systems, methods, and computer program products consistent with various embodiments of the present disclosure. Each block in the flowcharts or block diagrams can represent a module, a program segment, or a portion of code that includes one or more executable instructions for implementing the specified logical functions. It will be appreciated that in some other implementations, the functions denoted in the blocks may also occur in a different order than the one illustrated in the drawings. For example, the two successively blocks may in fact be executed substantially in parallel, and may sometimes be executed in a reverse order, according to the involved functions. It will be appreciated that each block of the block diagrams or flowcharts, and combinations of blocks in the block diagrams or flowcharts, can be implemented by a dedicated hardwarebased system that performs the specified functions or operations, or can be implemented by a combination of dedicated hardware and computer instructions.

It will be appreciated by those skilled in the art that the features described in the present disclosure embodiments and/or the claims of the present disclosure can be combined in various manners, even if such combinations are not explicitly recited in the present disclosure. The various features of the disclosed embodiments and/or claims of the present disclosure can be combined in various manners without departing from the spirit and scope of the present disclosure. All such combinations are within the scope of the present disclosure.

Although the present disclosure has been shown and described with respect to the exemplary embodiments of the present disclosure, it will be apparent to those skilled in the art that various changes can be made to the form and detail of the present disclosure without departing from the spirit and scope of the present disclosure. Therefore, the scope of the present disclosure should not be limited to the above-described embodiments, but should be determined not only by the appended claims but also by the equivalents of the appended claims.

What is claimed is:

1. An electronic device comprising:
    a first body including at least a first display screen having a display area that is exposed from a first surface of the first body; and
    a second body movably connected to the first body via a connecting component and including at least a second display screen that is exposed from a first surface of the second body and an acquisition apparatus for acquiring images via a second surface of the second body that is different from the first surface of the second body, wherein:
        the second body is rotatable from a first relative position with respect to the first body to a second relative position with respect to the first body; and
        after the second body is in the second relative position with respect to the first body:
            the first display screen is controlled to perform a display, and the second display screen is controlled to be closed; and
            the acquisition apparatus is configured as an image-capturing apparatus.

2. The electronic device according to claim 1, wherein:
    after the second body is in the first relative position with respect to the first body, the first surface of the second body and the first surface of the first body are in a same plane; and
    after the second body is in the second relative position with respect to the first body, the second surface of the second body is parallel to the first surface of the first body.

3. The electronic device according to claim 2, wherein:
    after the second body is in the first relative position with respect to the first body, the second display screen is configured to perform a splicing display in connection with the first display screen.

4. The electronic device according to claim 3, wherein the first display screen is controlled to display a first portion of an image, and the second display screen is controlled to display a second portion of the image, such that a complete output of the image comprising the first portion of the image and the second portion of the image is achieved.

5. The electronic device according to claim 3, wherein, after the second body is in the first relative position with respect to the first body, a first edge at the first surface of the second body aligns with a first edge at the first surface of the first body.

6. The electronic device according to claim 5, wherein:
    the first edge at the first surface of the second body and the first edge at the first surface of the first body are made of a first material.

7. The electronic device according to claim 6, wherein, in operation:
    light of the display area that is close to the first edge at the first surface of the first body extends toward the first edge at the first surface of the second body; and
    the light of the display area that is close to the first edge at the first surface of the second body extends toward the first edge at the first surface of the first body.

8. The electronic device according to claim 1, wherein:
    after the second body is in the second relative position with respect to the first body, the acquisition apparatus is awakened as a face recognition apparatus; and
    after recognition of a captured face is successful using the face recognition apparatus, the first display screen is controlled to be lighted up.

9. A method of controlling an electronic device having a first body including at least a first display screen having a display area that is exposed from a first surface of the first body, a second body having a second display screen and movably connected to the first body and movable from a first relative position with respect to the first body to a second relative position with respect to the first body, the method comprising:
    after the second body of the electronic device is in the first relative position with respect to the first body of the electronic device, controlling the first display screen arranged at the first body and the second display screen arranged at the second body to perform a splicing display operation; and
    after the second body of the electronic device is in the second relative position with respect to the first body of the electronic device, controlling the first display screen to perform the display whilst deactivating the second display screen.

10. The method according to claim 9, further including:
    in response to a first user operation or a start of a preset application, controlling the second body to change from the first relative position to the second relative position with respect to the first body.

11. The method according to claim 9, further including:
    in response to the second body reaching the second relative position with respect to the first body, waking up an acquisition apparatus comprised in the second body of the electronic device as a face recognition apparatus.

12. The method according to claim 11, further including:
    in response to the face recognition apparatus successfully recognizing a captured face, controlling the first display screen to be activated.

13. The method according to claim 9, further including:
    in response to a second user operation or a closing of the preset application, controlling the second body to be reset from the second relative position to the first relative position with respect to the first body.

14. An electronic device, comprising:
    a first body including at least a first display screen having a display area that is exposed from a first surface of the first body;
    a second body having a second display screen and movably connected to the first body and movable from a first relative position with respect to the first body to a second relative position with respect to the first body;

an acquisition apparatus; and a processor configured to perform:

after the second body of the electronic device is in the first relative position with respect to the first body of the electronic device, controlling the first display screen arranged at the first body and the second display screen arranged at the second body to perform a splicing display operation; and after the second body of the electronic device is in the second relative position with respect to the first body of the electronic device, controlling the first display screen to perform the display whilst deactivating the second display screen.

15. The electronic device according to claim 14, wherein the processor is further configured to perform:

in response to a first user operation or a start of a preset application, controlling the second body to change from the first relative position to the second relative position with respect to the first body.

16. The electronic device according to claim 14, wherein the processor is further configured to perform:

in response to the second body reaching the second relative position with respect to the first body, waking up the acquisition apparatus comprised in the second body of the electronic device as a face recognition apparatus.

17. The electronic device according to claim 15, wherein the processor is further configured to perform:

in response to the face recognition apparatus successfully recognizing a captured face, controlling the first display screen to be activated.

18. The electronic device according to claim 14, wherein the processor is further configured to perform:

in response to a second user operation or a closing of the preset application, controlling the second body to be reset from the second relative position to the first relative position with respect to the first body.

* * * * *